United States Patent
Huth-Fehre et al.

(10) Patent No.: US 6,542,239 B1
(45) Date of Patent: Apr. 1, 2003

(54) METHOD FOR TESTING THE FUNCTIONALITY OF A SPECTROMETER AND A SPECTROMETER COMPRISING A FAULT RECOGNITION DEVICE

(75) Inventors: Thomas Huth-Fehre, Altenberge (DE); Frank Kowol, Münster (DE)

(73) Assignee: Institut Fur Chemo Und Biusensorik Munster E.V. (DE)

( * ) Notice: Subject to any disclaimer, the term of this patent is extended or adjusted under 35 U.S.C. 154(b) by 0 days.

(21) Appl. No.: 09/744,326

(22) PCT Filed: Jul. 12, 1999

(86) PCT No.: PCT/EP99/04865

§ 371 (c)(1),
(2), (4) Date: Jan. 19, 2001

(87) PCT Pub. No.: WO00/05555

PCT Pub. Date: Feb. 3, 2000

(30) Foreign Application Priority Data

Jul. 21, 1998 (DE) .......................................... 198 33 793

(51) Int. Cl.$^7$ ................................................. G01J 3/51
(52) U.S. Cl. ..................................... 356/419; 356/326
(58) Field of Search ................................ 356/326, 328, 356/416, 418, 419, 323, 309; 250/226, 339.05–339.09; 702/85

(56) References Cited

U.S. PATENT DOCUMENTS

| 4,358,679 | A | | 11/1982 | Lipoma |
| 4,449,821 | A | | 5/1984 | Lee |
| 4,822,998 | A | | 4/1989 | Yokota et al. |
| 5,032,710 | A | | 7/1991 | Nojiri |
| 5,042,948 | A | * | 8/1991 | Fletcher ................... 356/328 |
| 5,557,544 | A | | 9/1996 | Simon et al. |
| 6,240,372 | B1 | * | 5/2001 | Gross et al. ................ 700/79 |

FOREIGN PATENT DOCUMENTS

| DE | 221015 A1 | 11/1983 |
| DE | 4128912 C2 | 8/1991 |
| DE | 4202822 C2 | 1/1992 |
| EP | 0533490 B1 | 5/1995 |

\* cited by examiner

*Primary Examiner*—F. L. Evans
*Assistant Examiner*—Kara Geisel
(74) *Attorney, Agent, or Firm*—Young & Basile, P.C.

(57) ABSTRACT

The invention relates to a method for testing the functionality of a spectrometer for faults comprising at least one radiation source, one filter arrangement for separating the radiation into different wavelength ranges, and one receiving arrangement. The invention also relates to a spectrometer comprising a fault recognition device. Reference values are generated at at least two different color temperatures of the radiation source and in the different wavelength ranges. Actual received signals at at least two color temperatures to be set are compared with the reference values in order to test the spectrometer. In the occurrence of variations, the type of variation is determined according to the wavelength ranges and the color temperatures, and definite faults are concluded from the type of variation.

15 Claims, 2 Drawing Sheets

Figure 1:
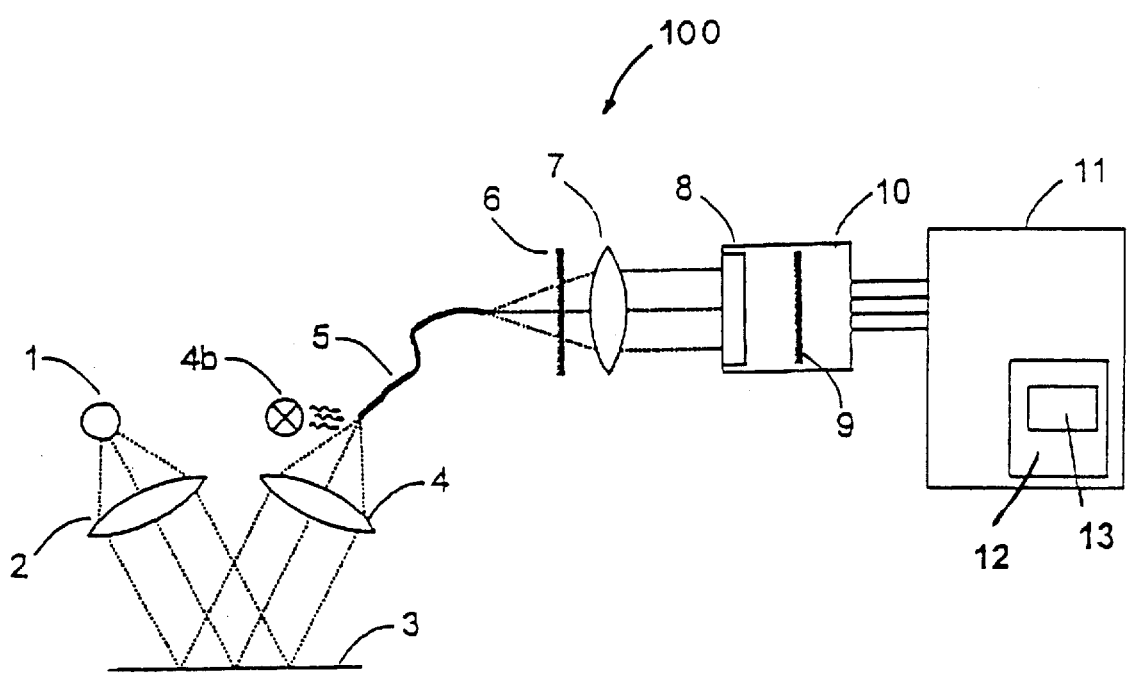

METHOD FOR TESTING THE FUNCTIONALITY OF A SPECTROMETER AND A SPECTROMETER COMPRISING A FAULT RECOGNITION DEVICE

The invention concerns a method for testing the functionality of a spectrometer for faults and a spectrometer with fault detection device.

Optical spectrometers of simple construction are being used increasingly in various fields and areas of technology, thus for example in the automobile sphere or in application for sorting articles. One of the main problems of such optical spectrometers is monitoring the long-term stability of the system. Thus, firstly the state of the primary light source and the transmission or degree of soiling of the spectrometer must be monitored and secondly the spectral calibration of the system must be ensured. But the current state of the art has so far provided no options, or only elaborate ones, for validating the optical specifications of a spectrometer as a whole, and enables only limited electronic testing of the individual components. Also the usual subsequent referencing of the spectrometer with a sample or the like does not by any means guarantee functioning of the system, for example in the case of damaged filters.

It is therefore the object of the invention to provide a method for testing the functionality of a spectrometer and a spectrometer, with which it is possible to monitor the long-term stability of the spectrometer even if the spectrometer is not directly accessible.

This object is achieved according to the invention by the characterising features of the main claim and ancillary claim in combination with their introductory parts.

An essential concept of the invention lies in variably adjusting the colour temperature of a radiation source and, on the basis of the known Planck radiation curve which with a very good approximation also applies to the radiation source used, to infer the optical characteristics of the spectrometer. Due to the known emission values of the radiation source at different colour temperatures, it is possible to develop a suitably large data space for fully optically testing the spectrometer. Here the known emission values used as reference values can be determined by a parallel spectrometer with N wavelength channels for example at two colour temperatures of the radiation source, yielding the resulting 2N-dimensional data space for testing the spectrometer. For the process of long-term monitoring there may be provided a secondary radiation source which is arranged on the receiver side, that is, behind the object to be transmitted or reflected and which is adjustable to freely selectable colour temperatures. But the colour temperature of the primary radiation source can also be traversed, but in this case care must be taken that the optical path contains no variable parameters, such as for example objects with varying material properties or characteristic photometric factors. This can be avoided by a reference material, for example Teflon.

With the invention, a test of the following spectrometer parameters can be performed:
1. The total transmission of the spectrometer can be detected through the intensity of the individual channels (monitoring for fibre breaks, lens scratches, power failure of the electronic amplifier unit, failure of the primary radiation source or secondary radiation source);
2. the individual transmission of the different filters or detectors is tested through the individual intensity of the various channels (monitoring of the individual filter transmissions and integral spectral sensitivity of the individual detectors or their total failure);
3. the individual spectral characteristics of the optical components can be monitored on the basis of the deviation of a single channel from the nominal value when the other channels have constant values (monitoring of colour centre formation of the fibre, absorption of the lens, wavelength shift of the individual filters);
4. the integral spectral characteristics serve as self-monitoring of the secondary radiation source (monitoring of the colour temperature in case of a constant lamp current with reference value fixed beforehand).

On account of fault detection, in case of minor deviations an internal recalibration of the spectrometer can be performed, otherwise in case of major faults an exact fault message or diagnosis can be outputted, so that any repair is made substantially easier.

The invention offers a reliable diagnostic unit without major expenditure on maintenance for long-term operation of a spectrometer, for example in the automobile sphere, without which unit it is not possible to use the spectrometer.

Due to the measures provided in the subsidiary claims, advantageous developments and improvements are possible.

Practical examples of the invention are shown in the drawings and described in more detail in the description below. They show:

FIG. 1 the schematic construction of a spectrometer such as can be used for example in the automobile sphere, FIGS. 2a to 2d graphs of the possible testable spectrometer faults with a radiation source with a variably adjustable colour temperature.

The spectrometer 100 shown in FIG. 1 has a radiation or light source 1 which is for example designed as a halogen lamp with a broad spectrum. The light emitted by the halogen lamp 1 is converted by a lens 2 to a parallel beam which irradiates an object 3 shown schematically. This object 3 can move rapidly past the radiation source, so that rapid spectral measurement of all wavelengths or all desired wavelengths must be performed simultaneously. The light reflected by the object 3 is collected with a convex lens 4 and fed to a light guide 5. In the practical example the light exiting from the light guide 5 is scattered through a diffuser lens 6 and formed parallel by means of a convex lens 7 and passed to an interference filter assembly 8. Behind the filter assembly 8, which for example has narrow-band interference filters, is a receiver assembly 9 which in the present case is designed as one or more photodiodes. Four different interference filters 8 are provided, for example, in which case there can be used, corresponding to these four different interference filters, a quadrant photodiode 9 on which preferably the interference filters 8 are deposited directly by vapour deposition on the window of the quadrant photodiode 9. Filter and diode are contained in a housing 10. The four detectors of the quandrant photodiode 9 detect the intensity of the four wavelengths and transmit this signal to an evaluation unit 11.

Naturally other types of detectors and filters can be used too, for example a CCD line or matrix detector can be used, omitting the filters in case of wavelength-selective detector elements.

In the evaluation unit 11 the received wavelength signals are evaluated in relation to the object 3.

The evaluation unit 11 includes a fault detection or diagnostic unit 12 which detects faults in the transmission path of the radiation. In order to offer the possibility of making a diagnosis without falsifications of the radiation source by the object 3 occurring, on the receiving side is provided a secondary radiation or light source 4b whose emitted radiation is fed directly to the light guide 5 via deflection means such as beam splitters or the like. In the diagnosis the light source 1 and/or the secondary light source 4b are set to given colour temperatures, the light sources being set to these colour temperatures by a controlled and/or regulated voltage supply. By means of the receiver assembly 9, which in the present case receives light or radiation in four wavelength ranges or wavelength channels, four electrical reception signals are formed, which are further processed in the evaluation and diagnostic unit 11, 12.

The diagnostic unit 12 has a plurality of reference values stored for n different colour temperatures with N different wavelength ranges, yielding a n×N-dimensional "data space". The reference values are either measured with a spectral photometer "as new" or in a parallel spectrometer and stored in the diagnostic unit 12. Additionally or instead of the measured reference values, reference values can be calculated with the Planck radiation formula, as the radiation source is similar to a Planck radiator.

If a diagnosis of a spectrometer which is fitted for example in a motor vehicle is to be made, the secondary light source 4b is switched on and preferably the light source 1 is switched off, the secondary light source 4b being adjustable to different colour temperatures by a controlling and regulating unit which is connected to the voltage or current supply. In the event that the radiation path between light source 1 and light guide 5 is also to be assessed, the light source 1 serves as a diagnostic radiation source, in which case however the object 3 must be designed in such a way that the reference values stored in the diagnostic unit hold good. Usually the diagnosis with secondary light source 4b will be sufficient, as light source 1 and lenses 2, 4 are contained in an encapsulated housing, so that except for failure of the light source 1 the essential faults occur behind the secondary light source 4b.

The diagnostic unit 12 evaluates the reception signals of the different wavelength channels as to whether faults arise, and outputs on the display 13 the message as to what fault is involved or whether the spectrometer must be recalibrated.

The manner of evaluation and the possible faults are described in connection with FIG. 2. In the figure reception intensities are shown over the wavelength, the spectrometer having four different wavelength ranges or wavelengths.

In FIG. 2 the photocurrent of the detectors or diodes is shown as a function of the wavelength. The curves 14 and 15 are reference curves at two different colour temperatures, these curves being calculated with the Planck radiation formula, taking into account the optical elements existing in the beam path, and/or being measured beforehand with a reference spectrometer of the same construction.

The respective measured values 16 in FIG. 1 all lie on the curves 14, 15 with given colour temperatures of the secondary light source 4b. These measured values correspond to the reference values, that is, there is no fault.

Figure 2A:
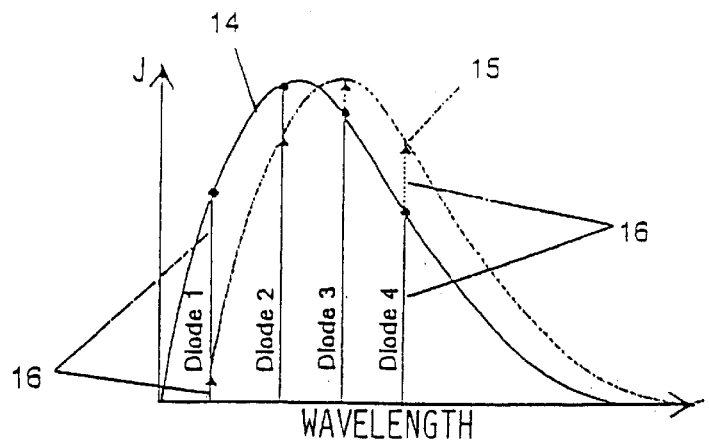
Figure 2B:
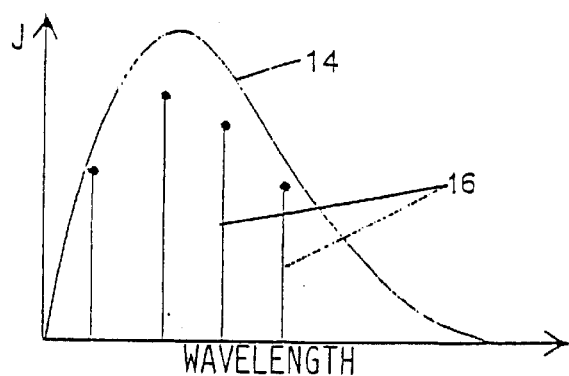

In FIG. 2b it can be seen that all the measured values 16 are located by a constant factor below the nominal curve 14 preset by the reference values at this colour temperature. This means that the same fault occurs for all wavelength channels, that is, the radiation path is soiled or a lens is damaged.

Figure 2C:
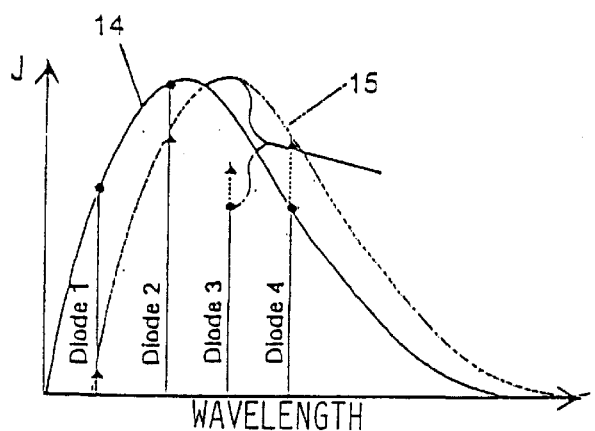
Figure 2D:
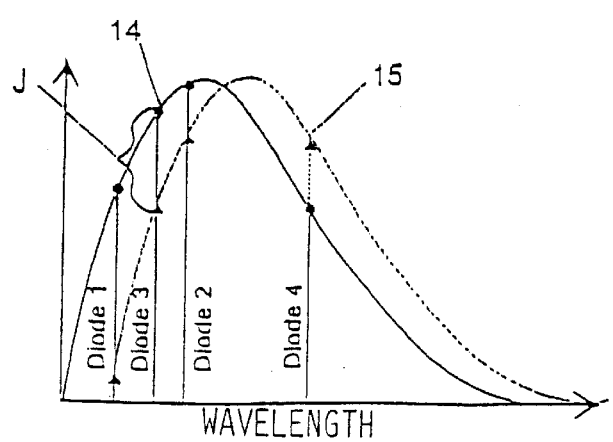

If in the diagnostic measurement some, in FIGS. 2c and 2d all except one, tally with the nominal curve 14 at a given colour temperature, then a further distinction must be made because both a diode or the amplifier unit or a dispersive element, for example a colour filter, can be defective. According to FIG. 2d the filter can be so damaged that a wavelength other than the desired one is let through. To be able to distinguish cases c) and d), the colour temperature is varied by ΔT corresponding to curve 15 and the variation of the reception signal is monitored. According to c) the now altered photocurrent of the diode varies proportionally with the incident luminous power of the light source. Nominal and actual values of the photocurrents vary with a constant factor, so that a fault of the diode can be inferred. In FIG. 2d the diode 3 is shifted in wavelength and both photocurrents of the diode 3 now have the inverse relationship. There is no longer a constant factor here, but the factor depends on the wavelength shift of the filters, that is, the filter of the diode 3 is defective.

To detect whether the colour temperature remains constant during the respective individual measurements, the current consumption can be monitored, that is, if the current consumption of the lamp varies, its colour temperature varies. In this case the light source is defective and in extreme cases no current flows, that is, the light source has failed altogether. To test whether the colour temperature really stays exactly the same, a photodiode which monitors the total power of the lamp can also be used. The latter varies when the colour temperature shifts.

What is claimed is:

1. Method for testing the functionality of a spectrometer for faults, which has at least one radiation source, a filter assembly for breaking down the radiation into different wavelength ranges and a receiver assembly for measuring the radiation and giving off reception signals for the different wavelength ranges, comprising the steps of:

providing reference values for at least two different colour temperatures of the radiation source and in each case for the different wavelength ranges, comparing the reception signals from the receiver assembly with the reference values of the at least two colour temperatures to be adjusted to test the spectrometer, and in the case of deviations, determining the type of deviation as a function of the wavelength ranges and the colour temperatures and inferring certain faults from the type of deviation.

2. Method according to claim 1, further comprising the steps of:

controlling the current supply of the radiation source and providing a receiver for detecting the total power of the radiation source in case of regulation.

3. Method according to claim 1 wherein in the case of deviations of the reception signals of all the different wavelength ranges at one colour temperature from the reference values by the same factor, a first fault is detected.

4. Method according to claim 1 wherein if deviations arise in one or more wavelength ranges while no deviations arise in the remaining wavelength ranges, the colour temperature is selectively varied and a first fault is detected by what factor the respective deviation varies at different colour temperatures.

5. Method according to claim 4, wherein in case of deviations with the same wavelength range and different colour temperatures by a constant factor, a second fault is detected.

6. Method according to claim 5, wherein in case of deviations with the same wavelength range and different colour temperatures by a non-constant factor, a third fault is detected.

7. Method according to claim 1 wherein the reference values are provided as measured values using at least one of the methods of measuring with a reference spectrometer with N different wavelengths and n different colour temperatures as a N×n data space and calculating with the Planck radiation formula.

8. Method according to claim 1, wherein the step of providing reference values includes the step of at least one of calculating the reference values with the Planck radiation formula and measuring the reference values with one of a spectral photometer and a parallel spectrometer.

9. Method according to claim 4, wherein the colour temperature is selectively varied by a controlled voltage supply.

10. Spectrometer with a radiation source for irradiating an object, a filter assembly for breaking down into different wavelength ranges the radiation transmitted or reflected at the object, and a receiver assembly for measuring the radiation and giving off reception signals for the different wavelength ranges, comprising:

at least one of a primary radiation source and a secondary radiation source; a fault detection device having reference values stored therein for the radiation, said reference values determined by at least one of measuring with the different wavelength ranges and for different colour temperatures of the at least one of the primary radiation source and the secondary radiation source, and calculating according to the Planck radiation curve; a variable current supply by which the colour temperature of the at least one of the primary radiation source and the secondary radiation source is adjustable, wherein the fault detection device compares the reception signals for different wavelength ranges and different colour temperatures with the corresponding reference values and determines the type of fault depending on the type of deviation in relation to at least one of the wavelength ranges and the colour temperatures.

11. Spectrometer according to claim 10, characterised in that a light guide is provided for further conducting the reflected or transmitted radiation.

12. Spectrometer according to claim 10, characterised in that the filter assembly has interference filters.

13. Spectrometer according to claim 10, characterised in that the receiver assembly has at least one photodetector.

14. Spectrometer according to claim 10, characterised in that an additional photoreceiver is provided for detecting the total power of at least one of the primary radiation source and the secondary source.

15. Spectrometer according to claim 10, characterised in that the current supply is connected to a control circuit which regulates the radiation power of at least one of the primary radiation source and the secondary radiation source.

* * * * *